United States Patent
Kato et al.

(10) Patent No.: US 9,160,034 B2
(45) Date of Patent: Oct. 13, 2015

(54) METHOD FOR PRODUCING SULFIDE SOLID ELECTROLYTE MATERIAL AND METHOD FOR PRODUCING LITHIUM SOLID STATE BATTERY

(75) Inventors: Yuki Kato, Susono (JP); Koji Kawamoto, Miyoshi (JP); Shigenori Hama, Susono (JP); Takamasa Otomo, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 376 days.

(21) Appl. No.: 13/805,468

(22) PCT Filed: Jun. 29, 2010

(86) PCT No.: PCT/JP2010/061066
§ 371 (c)(1),
(2), (4) Date: Dec. 31, 2012

(87) PCT Pub. No.: WO2012/001773
PCT Pub. Date: Jan. 5, 2012

(65) Prior Publication Data
US 2013/0097854 A1    Apr. 25, 2013

(51) Int. Cl.
| H01M 6/14 | (2006.01) |
| H01M 6/18 | (2006.01) |
| H01M 10/0562 | (2010.01) |
| H01M 4/82 | (2006.01) |
| H01M 10/052 | (2010.01) |
| H01M 10/058 | (2010.01) |
| H01M 4/485 | (2010.01) |
| H01M 4/505 | (2010.01) |
| H01M 4/525 | (2010.01) |
| H01M 4/58 | (2010.01) |

(52) U.S. Cl.
CPC ........ *H01M 10/0562* (2013.01); *H01M 10/052* (2013.01); *H01M 10/058* (2013.01); *H01M 4/485* (2013.01); *H01M 4/505* (2013.01); *H01M 4/525* (2013.01); *H01M 4/5825* (2013.01); *H01M 2300/0068* (2013.01); *Y02E 60/122* (2013.01); *Y02T 10/7011* (2013.01); *Y10T 29/49108* (2015.01)

(58) Field of Classification Search
CPC .......... H01M 10/0562; H01M 10/052; H01M 10/058; H01M 4/485; H01M 4/505; H01M 4/525; H01M 4/5825; H01M 2300/0068; Y01M 29/49108; Y02T 10/7011; Y02E 60/122
USPC .......................... 429/322, 305, 303; 29/623.1
See application file for complete search history.

(56) References Cited

U.S. PATENT DOCUMENTS

| 2007/0160911 A1* | 7/2007 | Senga et al. ................. 429/322 |
| 2012/0034529 A1 | 2/2012 | Tatsumisago et al. |

FOREIGN PATENT DOCUMENTS

| CN | 1918668 A | 2/2007 |
| JP | A-2002-109955 | 4/2002 |
| JP | 2010199033 A | 9/2010 |

OTHER PUBLICATIONS

Hayashi, Akitoshi et al., "Preparation of $Li_2S$—$P_2S_5$ Amorphous Solid Electrolytes by Mechanical Milling," *J. Am. Ceram. Soc.*, vol. 84, No. 2, pp. 477-479, 2001.

*Primary Examiner* — William Cheung
(74) *Attorney, Agent, or Firm* — Oliff PLC

(57) ABSTRACT

A method for producing a sulfide solid electrolyte material having a small amount of hydrogen sulfide generation and a high Li ion conductivity. To achieve the above, a method for producing a sulfide solid electrolyte material is provided, including steps of: a providing step for providing a crystallized sulfide solid electrolyte material prepared by using a raw material composition containing $Li_2S$ and $P_2S_5$; and an amorphizing step for applying amorphization treatment to the crystallized sulfide solid electrolyte material.

8 Claims, 4 Drawing Sheets

METHOD FOR PRODUCING SULFIDE SOLID ELECTROLYTE MATERIAL AND METHOD FOR PRODUCING LITHIUM SOLID STATE BATTERY

This patent application is a U.S. national stage application under 35 U.S.C. Section 371 of International Patent Application No. PCT/JP2010/061066 filed on Jun. 29, 2010.

TECHNICAL FIELD

The present invention relates to a method for producing an $Li_2S$—$P_2S_5$-based sulfide solid electrolyte material having a high Li ion conductivity.

BACKGROUND ART

Along with the recent rapid spread of information-related devices and communication devices such as a personal computer, a video camera, and a cell phone, development of a battery utilized as a power source of them is important. In the automobile industry and the like, development of a high-power and high-capacity battery for electric vehicles or hybrid vehicles has been proceeding. Currently, among various types of batteries, a lithium battery becomes a focus of attention in terms of high energy density.

Since currently commercially available lithium batteries employ a liquid electrolyte containing a flammable organic solvent, it is necessary to install a safety device which suppresses an increase in temperature in the event of a short circuit and improve a structure and a material for short-circuit prevention. On the other hand, all solid lithium batteries which replace an liquid electrolyte with a solid electrolyte layer and are fully solidified do not use a flammable organic solvent in the batteries. For this reason, it is considered that the safety devices for the all solid batteries are simplified and the all solid lithium batteries are excellent in production cost and productivity. As a solid electrolyte material used in such a solid electrolyte layer, a sulfide solid electrolyte material has been known.

Since the sulfide solid electrolyte material has a high Li ion conductivity, this is useful to attain high output of a battery, and various studies have been conducted. For example, Patent Literature 1 discloses sulfide-based crystallized glass in which a glass phase mainly composed of $Li_2S$ and $P_2S_5$ and a crystal phase exist.

CITATION LIST

Patent Literature

Patent Literature 1: Japanese Patent Application Publication (JP-A) No. 2002-109955

SUMMARY OF INVENTION

Technical Problem

The present inventors have found that a crystallized $Li_2S$—$P_2S_5$-based sulfide solid electrolyte material tends to have a small amount of hydrogen sulfide generation. However, there is a problem that the crystallized $Li_2S$—$P_2S_5$-based sulfide solid electrolyte material has a low Li ion conductivity. The present invention was made in view of the above problems, and a main object thereof is to provide a step for producing an $Li_2S$—$P_2S_5$-based sulfide solid electrolyte material having a high Li ion conductivity.

Solution to Problem

In order to solve the above problem, the present invention provides a method for producing a sulfide solid electrolyte material comprising steps of: a providing step for providing a crystallized sulfide solid electrolyte material prepared by using a raw material composition containing $Li_2S$ and $P_2S_5$; and an amorphizing step for applying amorphization treatment to the crystallized sulfide solid electrolyte material.

According to the present invention, grain boundary resistivity of a crystal can be reduced by performing the amorphizing step. Accordingly, a sulfide solid electrolyte material having a high Li ion conductivity can be obtained.

In the above invention, the providing step preferably has: an amorphization treatment step for applying an amorphization treatment to the above raw material composition and obtaining an amorphized sulfide solid electrolyte material, and a crystallization treatment step for applying crystallization treatment by heat treatment to the amorphized sulfide solid electrolyte material and obtaining the crystallized sulfide solid electrolyte material. This is because a residual amount of $Li_2S$ can be reduced by the crystallization treatment.

In the above invention, the temperature of the heat treatment in the crystallization treatment step is preferably not less than 300° C. This is because if the heating temperature is too low, the residual amount of $Li_2S$ may not be effectively reduced.

In the above invention, the providing step is preferably a solid-phase reaction step for producing a solid phase reaction by heat treatment in the raw material composition and obtaining the crystallized sulfide solid electrolyte material. This is because the crystallized sulfide solid electrolyte material can be obtained by a one-stage step, so that the step can be simplified.

In the above invention, the ratio of $Li_2S$ and $P_2S_5$ in the raw material composition is preferably within a range of $Li_2S$:$P_2S_5$=70:30 to 80:20 on a molar basis, and this is because the sulfide solid electrolyte material having a smaller amount of hydrogen sulfide generation can be obtained.

In the above invention, the residual amount of $Li_2S$ in the crystallized sulfide solid electrolyte material is preferably not more than 1 mol %, and this is because the sulfide solid electrolyte material having a smaller amount of hydrogen sulfide generation can be obtained.

In the above invention, the amorphization treatment in the amorphizing step is preferably mechanical milling, and this is because treatment at room temperature can be realized, and the production step can be simplified.

The present invention provides a method for producing a lithium solid state battery, which comprises a cathode active material layer containing a cathode active material, an anode active material layer containing an anode active material, and a solid electrolyte layer formed between the cathode active material layer and the anode active material layer, characterized in that the sulfide solid electrolyte material obtained by the method for producing a sulfide solid electrolyte material described above is added to at least one of the cathode active material layer, the anode active material layer, and the solid electrolyte layer.

According to the present invention, a lithium solid state battery having high safety and suitable for attainment of high output can be obtained by using the above sulfide solid electrolyte material.

Advantageous Effects of Invention

The present invention provides such an effect that a sulfide solid electrolyte material having a high Li ion conductivity can be obtained.

DESCRIPTION OF EMBODIMENTS

Hereinafter, a method for producing a sulfide solid electrolyte material and a method for producing a lithium solid state battery according to the present invention will be described in detail.

A. Method for Producing Sulfide Solid Electrolyte Material

First, a method for producing a sulfide solid electrolyte material according to the present invention will be described. The method for producing a sulfide solid electrolyte material according to the present invention comprises steps of: a providing step for providing a crystallized sulfide solid electrolyte material prepared by using a raw material composition containing $Li_2S$ and $P_2S_5$; and an amorphizing step for applying amorphization treatment to the crystallized sulfide solid electrolyte material.

According to the present invention, grain boundary resistivity of a crystal can be reduced by performing the amorphizing step. Accordingly, a sulfide solid electrolyte material having a high Li ion conductivity can be obtained.

Figure 1:
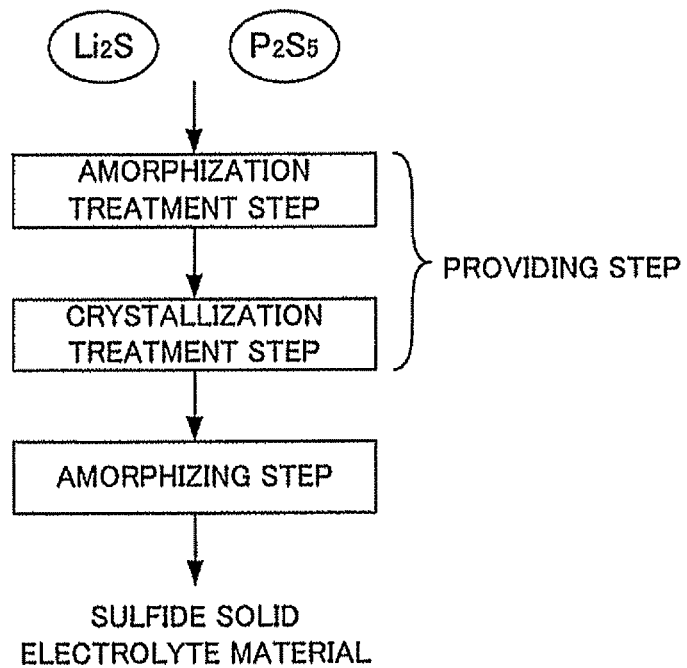
FIG. 1 is a flowchart for explaining an example of a method for producing a sulfide solid electrolyte material according to the present invention.

FIG. 1 is a flowchart for explaining an example of a method for producing a sulfide solid electrolyte material according to the present invention. First, a raw material composition containing $Li_2S$ and $P_2S_5$ at a molar ratio of $Li_2S:P_2S_5=75:25$ is prepared. Then, the raw material composition is subjected to mechanical milling, and an amorphized sulfide solid electrolyte material is obtained (amorphization treatment step). Then, the amorphized sulfide solid electrolyte material is subjected to crystallization treatment by heat treatment, and a crystallized sulfide solid electrolyte material is obtained (crystallization treatment step). In FIG. 1, the two steps correspond to the providing step. Next, the crystallized sulfide solid electrolyte material is subjected to the mechanical milling (amorphizing step). According to this constitution, a sulfide solid electrolyte material having a high Li ion conductivity can be obtained.

Figure 2:
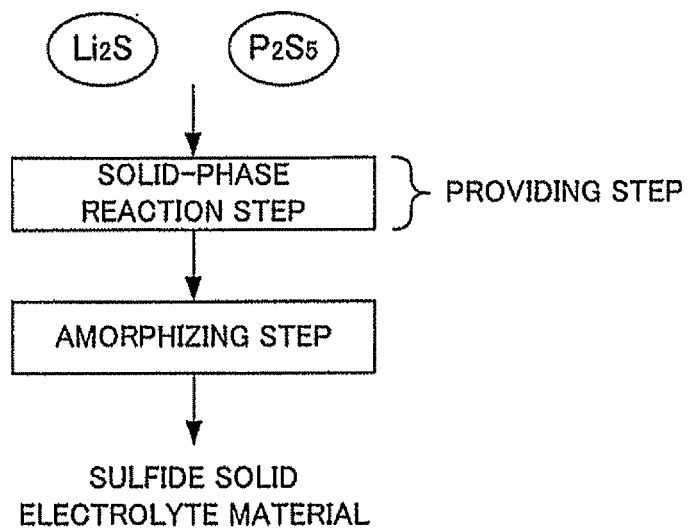
FIG. 2 is a flow chart for explaining another example of a method for producing a sulfide solid electrolyte material according to the present invention.

FIG. 2 is a flow chart for explaining another example of a method for producing a sulfide solid electrolyte material according to the present invention. First, the raw material composition containing $Li_2S$ and $P_2S_5$ at a molar ratio of $Li_2S:P_2S_5=75:25$ is prepared. Then, heat treatment is applied to a raw material composition in a vacuum to produce a solid-phase reaction and to obtain a crystallized sulfide solid electrolyte material (solid-phase reaction step). In FIG. 2, the solid-phase reaction step corresponds to the providing step. Next, the crystallized sulfide solid electrolyte material is subjected to the mechanical milling (amorphizing step). According to this constitution, a sulfide solid electrolyte material having a high Li ion conductivity can be obtained.

Hereinafter, the method for producing a sulfide solid electrolyte material according to the present invention will be described for each step.

1. Providing Step

The providing step in the present invention is a step for providing a crystallized sulfide solid electrolyte material prepared by using a raw material composition containing $Li_2S$ and $P_2S_5$. In the present invention, the above sulfide solid electrolyte material may be synthesized itself, or a commercial product may be used. When the sulfide solid electrolyte material is synthesized, the synthesizing method can be broadly divided into two embodiments.

(1) First Embodiment

The first embodiment of the providing step of the present invention comprises steps of: an amorphization treatment step for applying amorphization treatment to the above raw material composition and obtaining an amorphized sulfide solid electrolyte material, and a crystallization treatment step for applying crystallization treatment by heat treatment to the amorphized sulfide solid electrolyte material and obtaining the crystallized sulfide solid electrolyte material.

(I) Amorphization Treatment Step

In the amorphization treatment step in the first embodiment, the amorphization treatment is applied to the raw material composition, and an amorphized sulfide solid electrolyte material is obtained.

The raw material composition in the first embodiment contains at least $Li_2S$ and $P_2S_5$. The raw material composition may contain only $Li_2S$ and $P_2S_5$ or may further contain other raw materials. It is preferable that $Li_2S$ contained in the raw material composition has fewer impurities, because a side reaction can be suppressed. Examples of a method for synthesizing $Li_2S$ include a method disclosed in, for example, JP-A No. H07-330312. It is further preferable that $Li_2S$ is purified using a method disclosed in WO2005/040039 and the like. Similarly, it is preferable that $P_2S_5$ contained in the raw material composition has fewer impurities.

The ratio of $Li_2S$ and $P_2S_5$ in the raw material composition is preferably within a range of $Li_2S:P_2S_5=70:30$ to $80:20$ on a molar basis, more preferably within a range of $Li_2S:P_2S_5=73:27$ to $77:23$, and still more preferably within a range of $Li_2S:P_2S_5=74:26$ to $76:24$. This is because a sulfide solid electrolyte material with a smaller amount of hydrogen sulfide generation can be obtained. If the ratio of $Li_2S$ to $Li_2S$ and $P_2S_5$ is too large, the hydrogen sulfide generation amount derived from the residual $Li_2S$ is too large, and therefore it is not preferable.

In the amorphized sulfide solid electrolyte material, the amount of residual $Li_2S$ can be controlled by, for example, regulating the content of $Li_2S$ and $P_2S_5$. Theoretically, when the ratio of $Li_2S$ to $Li_2S$ and $P_2S_5$ is a ratio capable of obtaining an ortho-composition, a sulfide solid electrolyte material with no residual $Li_2S$ is obtained. The term "ortho" generally means an oxo acid having the highest degree of hydration among oxo acids obtained by hydrating the same oxide. In the sulfide solid electrolyte material prepared by using $Li_2S$, a crystal composition of a sulfide having a largest amount of $Li_2S$ added is referred to as the ortho-composition. $Li_3PS_4$ corresponds to an ortho-composition in an $Li_2S$—$P_2S_5$-based solid electrolyte material. When a raw material is mixed in the ratio of $Li_2S:P_2S_5=75:25$ on a molar basis, a sulfide solid electrolyte material having an ortho-composition is obtained.

Theoretically, since $Li_2S$ does not remain in the sulfide solid electrolyte material having an ortho-composition, the generation of hydrogen sulfide derived from $Li_2S$ can be prevented. However, in fact, as described in an example to be described later, it has been confirmed that a slight amount of $Li_2S$ remains even in the sulfide solid electrolyte material having an ortho-composition. It is considered that this is because when a sulfide solid electrolyte material is obtained from a raw material composition, it is difficult to completely uniformly amorphize the sulfide solid electrolyte material.

It is preferable that the amorphized sulfide solid electrolyte material has a smaller residual amount of $Li_2S$. Specifically, the $Li_2S$ residual amount (residual concentration) is preferably not more than 10 mold, more preferably not more than 5 mol %, and still more preferably not more than 3 mold. The $Li_2S$ residual amount can be determined by X-ray photoelectron spectroscopy (XPS) measurement, for example. Namely, three sulfur states are assumed, and fitting is performed. The area ratio of $S_{2P1/2}$ and $S_{2P3/2}$ of each sulfur is fixed so that $S_{2P1/2}:S_{2P3/2}=1:2$, and a shift interval between $S_{2P1/2}$ and $S_{2P3/2}$ is set to 1.3 eV. The peak positions in the three sulfur states are variable. The peak position where the fitting is best is selected, and peak fitting is performed. In such case, the sulfur state having a peak in the lowest energy is determined as $Li_2S$, an S fraction ($Li_2S$ residual amount) of $Li_2S$ can be determined by an area ratio of each state. The three sulfur states are estimated to be S—P, Li—S—P, and $Li_2S$ ($S^{2-}$) from the high energy side sequentially.

The $Li_2S$ residual amount may be determined by $^{31}P$ NMR. Namely, a structure fraction around P is calculated by $^{31}P$ NMR, and the structure fraction of $Li_2S$ can be calculated from a P amount and an S amount in a raw material composition. XPS and $^{31}P$ NMR may be combined.

Examples of other raw materials to be added to the raw material composition include at least one lithium orthooxo acid selected from the group consisting of $Li_3PO_4$, $Li_4SiO_4$, $Li_4GeO_4$, $Li_3BO_3$, and $Li_3AlO_3$. By adding lithium orthooxo acid, a more stable sulfide solid electrolyte material can be obtained.

The amorphization treatment in this step is not limited especially as long as an amorphized sulfide solid electrolyte material can be obtained in this treatment, and examples thereof include mechanical milling and melt extraction. Particularly, the mechanical milling is preferable, because the treatment at room temperature can be realized, and the production step can be simplified.

The mechanical milling is not limited especially as long as a raw material composition is mixed while imparting mechanical energy, and examples thereof include a ball mill, a vibrating mill, a turbo mill, mechanofusion, and a disc mill. Particularly, the ball mill is preferable, and a planetary ball mill is particularly preferable. This is because an amorphized sulfide solid electrolyte material can be efficiently obtained.

Various conditions of mechanical milling are set so that an amorphized sulfide solid electrolyte material can be obtained. For example, when a planetary ball mill is used, a raw material composition and pulverizing balls are added, and processing is performed for a predetermined time at a predetermined rotation number. In general, the larger the rotation number, the faster the generation speed of the sulfide solid electrolyte material, and the longer the processing time, the higher a conversion rate from the raw material composition to the sulfide solid electrolyte material. The rotation number in the planetary ball milling is within a range of 200 rpm to 500 rpm, for example and particularly preferably within a range of 250 rpm to 400 rpm. The processing time of the planetary ball milling is within a range of 1 hour to 100 hours, for example and particularly preferably within a range of 1 hour to 50 hours.

(Ii) Crystallization Treatment Step

In the crystallization treatment step in the present invention, crystallization treatment by heat treatment is applied to the amorphized sulfide solid electrolyte material, and the crystallized sulfide solid electrolyte material is obtained.

In the present invention, it is preferable that the $Li_2S$ residual amount is reduced by the crystallization treatment by heat treatment. Although the reason why the $Li_2S$ residual amount is reduced is not known yet, it is considered that when a unit (for example, a $Li_4P_2S_6$ unit) included in the sulfide solid electrolyte material before heat treatment and residual $Li_2S$ are reacted with each other, a more chemically stable unit (for example, a $Li_3PS_4$ unit) is generated.

The $Li_2S$ residual amount (residual concentration) can be determined by XPS measurement and NMR measurement similarly to above. When the $Li_2S$ residual concentration of the amorphized sulfide solid electrolyte material (sulfide solid electrolyte material before heat treatment) is represented by $D_A$ (mol %) and the $Li_2S$ residual concentration of the crystallized sulfide solid electrolyte material (sulfide solid electrolyte material after heat treatment) is represented by $D_B$ (mol %), a value of $D_B/D_A$ may be less than 100%, and preferably not more than 20%. This is because the generation of hydrogen sulfide derived from $Li_2S$ can be effectively suppressed. The value of $D_B$ is preferably not more than 3 mol %, for example, and more preferably not more than 1 mold. Especially, when the $Li_2S$ residual amount is not more than 1 mol %, the amount approaches the measurement limit, and this case shows a state in which $Li_2S$ does not remain substantially.

Although the temperature of the heat treatment in this step is not limited especially as long as the heat treatment temperature is not less than the crystallization temperature of the sulfide solid electrolyte material, it is preferable that the heat treatment temperature is a temperature that allows reducing the $Li_2S$ residual amount. Specifically, the heat treatment temperature is preferably not less than 260° C., more preferably not less than 300° C., and still more preferably not less than 700° C. This is because if the heating temperature is too low, the $Li_2S$ residual amount may not be effectively reduced. Meanwhile, the heating temperature in the heat treatment is preferably not more than 1000° C., for example, and more preferably not more than 800° C. This is because if the heating temperature is too high, a crystal phase with a high hydrogen sulfide generation amount may be formed. Although the heating time in the heat treatment is not limited especially, the heating time is preferably within a range of 30 minutes to 24 hours, for example.

The atmosphere of the heat treatment in this step is preferably an inert gas atmosphere (for example, Ar atmosphere and $N_2$ atmosphere), because an unnecessary side reaction less likely occurs. The pressure in the heat treatment is not limited especially and may be under atmospheric pressure or under reduced pressure; however, the heat treatment pressure is preferably under reduced pressure and more preferably under vacuum. Specific examples of the heat treatment include a method using a baking furnace.

(2) Second Embodiment

The second embodiment of the providing step of the present invention comprises a solid-phase reaction step for producing a solid phase reaction by heat treatment in the raw material composition and obtaining the crystallized sulfide solid electrolyte material.

The raw material composition in the second embodiment contains at least $Li_2S$ and $P_2S_5$. The raw material composition may contain only $Li_2S$ and $P_2S_5$ or may further contain other raw materials. Since all features of the raw material composition are similar to those described in "(1) First Embodiment" described above, the description here will be omitted.

The $Li_2S$ residual amount (residual concentration) can be determined by XPS measurement and NMR measurement similarly to above. The $Li_2S$ residual amount of the crystallized sulfide solid electrolyte material is preferably not more than 3 mol %, for example, and more preferably not more than 1 mol %. Particularly when the $Li_2S$ residual amount is not more than 1 mol %, the amount approaches the measurement limit, and this case shows a state in which $Li_2S$ does not remain substantially.

Although the temperature of the heat treatment in this step is not limited especially as long as the heat treatment temperature is not less than the crystallization temperature of the sulfide solid electrolyte material, it is preferable that the heat treatment temperature is a temperature that allows reducing the $Li_2S$ residual amount. Specifically, the heat treatment temperature is preferably not less than 260° C., more preferably not less than 300° C., and still more preferably not less than 700° C. This is because if the heating temperature is too low, the $Li_2S$ residual amount may not be effectively reduced. Meanwhile, the heating temperature in the heat treatment is preferably not more than 1000° C., for example, and more preferably not more than 800° C. This is because if the heating temperature is too high, a crystal phase with a high hydrogen sulfide generation amount may be formed. Although the heating time in the heat treatment is not limited especially, the heating time is preferably within a range of 30 minutes to 24 hours, for example.

The atmosphere of the heat treatment in this step is preferably an inert gas atmosphere (for example, Ar atmosphere and $N_2$ atmosphere), because an unnecessary side reaction less likely occurs. The pressure in the heat treatment is not limited especially and may be under atmospheric pressure or under reduced pressure; however, the heat treatment pressure is preferably under reduced pressure and more preferably under vacuum. Specific examples of the heat treatment include a method using a baking furnace.

2. Amorphization Step

The amorphizing step in the present invention is a step for applying the amorphization treatment to the crystallized sulfide solid electrolyte material. When the crystallinity of the crystallized sulfide solid electrolyte material is lowered, grain boundary resistivity of a crystal can be reduced, and Li ion conductivity can be increased.

In terms of reducing the influence of the grain boundary resistivity of a crystal, it is preferable to further reduce the crystallinity of the crystallized sulfide solid electrolyte material. The sulfide solid electrolyte material before the amorphizing step is subjected to the XRD measurement (using CuKα), and when the intensity of the main peak (peak having the largest intensity) is represented by $I_M$ and the intensity of the main peak of the sulfide solid electrolyte material after the amorphizing step is represented by $I_{M'}$, it is preferable that $I_{M'}$ is not more than 50% relative to $I_M$, more preferably not more than 30%, and still more preferably not more than 10%. This is because, a sulfide solid electrolyte material having a higher Li ion conductivity can be obtained. Especially, in the present invention, it is preferable that the sulfide solid electrolyte material is amorphized in order to prevent the peak of the crystallinity from being detected.

The amorphization treatment in this step is not limited especially as long as the crystallinity of a crystallized sulfide solid electrolyte material can be lowered, and examples thereof include mechanical milling and melt extraction. Particularly, the mechanical milling is preferable, because the treatment at room temperature can be realized, and the production step can be simplified. Since kinds of the mechanical milling are similar to those described in "1. Providing step (1) Amorphization treatment step" described above, the description here will be omitted.

Various conditions of mechanical milling are set so that the Li ion conductivity higher than the Li ion conductivity of the crystallized sulfide solid electrolyte material can be obtained. The rotation number in the planetary ball milling is within a range of 200 rpm to 500 rpm, for example and particularly preferably within a range of 250 rpm to 400 rpm. The processing time of the planetary ball milling is within a range of 1 hour to 100 hours, for example and particularly preferably within a range of 1 hour to 50 hours.

3. Sulfide Solid Electrolyte Material

The sulfide solid electrolyte material obtained by the present invention has the Li ion conductivity. Thus, the sulfide solid electrolyte material can be used for any uses requiring the Li ion conductivity. Particularly, the sulfide solid electrolyte material is preferably used for a lithium battery and particularly preferably used for a lithium solid state battery. This is because the sulfide solid electrolyte material is useful as a solid electrolyte material constituting a solid electrolyte layer of a lithium solid state battery. The lithium battery may be a primary battery or a secondary battery and is particularly preferably a secondary battery. The reason therefor is because the secondary battery is repeatedly chargeable and dischargeable and is useful as a car-mounted battery, for example.

B. Method for Producing Lithium Solid State Battery

Next, a method for producing a lithium solid state battery according to the present invention will be described. The method for producing a lithium solid state battery according to the present invention is a method for producing a lithium solid state battery, which comprises a cathode active material layer containing a cathode active material, an anode active material layer containing an anode active material, and a solid electrolyte layer formed between the cathode active material and the anode active material, characterized in that a sulfide solid electrolyte material obtained by the above method for producing a sulfide solid electrolyte material is added to at least one of the cathode active material layer, the anode active material layer, and the solid electrolyte layer.

According to the present invention, a lithium solid state battery having high safety and suitable for attainment of high output can be obtained by using the above sulfide solid electrolyte material.

Figure 3A:
FIGS. 3A to 3C are each a schematic cross-sectional view showing an example of a step for producing a lithium solid state battery according to the present invention.
Figure 3B:
Figure 3C:
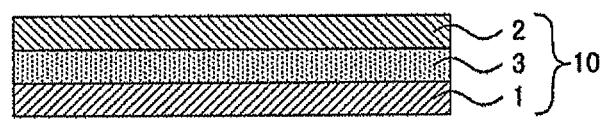

FIGS. 3A to 3C are each a schematic cross-sectional view showing an example of a step for producing a lithium solid state battery according to the present invention. First, a cathode active material layer-forming material containing a cathode active material is pressed to form a cathode active material layer 1 (FIG. 3A). Then, a solid electrolyte layer-forming material containing a solid electrolyte material is disposed on a surface of the cathode active material layer 1 to be pressed, and, thus, to form a solid electrolyte layer 3 (FIG. 3B). Then, an anode active material layer-forming material containing an anode active material is disposed on a surface of a solid electrolyte layer 3 to be pressed, and, thus, to form an anode active material layer 2 (FIG. 3C), whereby a power generating element 10 can be formed. A cathode current collector which collects the power of the cathode active material layer 1 and an anode current collector which collects power from the anode active material layer 2 are arranged on the power generating element 10, and the power generating element 10 is stored in a battery case and then swaged, whereby a lithium solid state battery can be obtained.

A major feature of the present invention is that at least one of the cathode active material layer-forming material, the solid electrolyte layer-forming material, and the anode active material layer-forming material contains a sulfide solid electrolyte material obtained by the above method for producing a sulfide solid electrolyte material. In FIGS. 3A to 3C, although the cathode active material layer 1, the solid electrolyte layer 3, and the anode active material layer 2 are formed in this order, this order is not limited especially, and these layers may be arbitrarily combined. Two or more ones of the cathode active material layer 1, the solid electrolyte layer 3, and the anode active material layer 2 may be formed simultaneously.

The method for producing a lithium solid state battery according to the present invention typically comprises a solid electrolyte layer formation step for forming a solid electrolyte layer with the use of a solid electrolyte layer-forming material containing a solid electrolyte material, a cathode active material layer formation step for forming a cathode active material layer with the use of a cathode active material layer-forming material containing a cathode active material, and an anode active material layer formation step for forming an anode active material layer with the use of an anode active material layer-forming material containing an anode active material. Hereinafter, these steps will be described in detail.

1. Solid Electrolyte Layer Formation Step

The solid electrolyte layer formation step in the present invention is a step for forming a solid electrolyte layer with the use of a solid electrolyte layer-forming material containing a solid electrolyte material. In the present invention, the solid electrolyte material contained in the solid electrolyte layer-forming material is preferably the sulfide solid electrolyte material obtained by the method described in "A. Method for producing sulfide solid electrolyte material" described above, because a lithium solid state battery having high safety and suitable for attainment of high output can be obtained. The solid electrolyte material contained in the solid electrolyte layer-forming material may be only the sulfide solid electrolyte material or may be a mixture of the sulfide solid electrolyte material and other solid electrolyte materials.

The content of the solid electrolyte material in the solid electrolyte layer-forming material is not limited especially as long as it is a ratio capable of obtaining desired insulation properties, and the content is within a range of 10% by volume to 100% by volume, for example, and preferably within a range of 50% by volume to 100% by volume. In particular, in the present invention, the solid electrolyte layer is preferably constituted of only the above sulfide solid electrolyte material. This is because a lithium solid state battery having high safety and suitable for attainment of high output can be obtained The solid electrolyte layer-forming material may contain a binder, because a solid electrolyte layer with flexibility can be obtained by adding the binder. Examples of the binder include a fluorine-containing binder such as PTFE.

The thickness of a solid electrolyte layer is within a range of 0.1 μm to 1000 μm, for example, and preferably within a range of 0.1 μm to 300 μm. Examples of a method for forming the solid electrolyte layer include a method for compression molding the solid electrolyte layer-forming material.

2. Cathode Active Material Layer Formation Step

The cathode active material layer formation step in the present invention is a step for forming a cathode active material layer with the use of a cathode active material layer-forming material containing a cathode active material. The cathode active material layer-forming material contains a cathode active material and may further contain at least one of a solid electrolyte material, a conductive material, and a binder.

In the present invention, the solid electrolyte material contained in the cathode active material layer-forming material is preferably the sulfide solid electrolyte material obtained by the method described in "A. Method for producing sulfide solid electrolyte material" described above, because a lithium solid state battery having high safety and suitable for attainment of high output can be obtained. The content of the solid electrolyte material in the cathode active material layer-forming material is within a range of 0.1% by volume to 80% by volume, for example, preferably within a range of 1% by volume to 60% by volume, and particularly preferably within a range of 10% by volume to 50% by volume.

Although the cathode active material is not limited especially, examples of the cathode active material include $LiCoO_2$, $LiMnO_2$, $Li_2NiMn_3O_8$, $LiVO_2$, $LiCrO_2$, $LiFePO_4$, $LiCoPO_4$, $LiNiO_2$, and $LiNi_{1/3}CO_{1/3}Mn_{1/3}O_2$. Examples of the conductive material include acetylene black, Ketzin black, and carbon fiber. Examples of the binder include a fluorine-containing binder such as PTFE.

The thickness of the cathode active material layer is preferably within a range of 0.1 μm to 1000 μm, for example. Examples of a method for forming the cathode active material layer include a method for compression molding the cathode active material layer-forming material.

3. Anode Active Material Layer Formation Step

The anode active material layer formation step in the present invention is a step for forming an anode active material layer with the use of an anode active material layer-forming material containing an anode active material. The anode active material layer-forming material contains an anode active material and may further contain at least one of a solid electrolyte material, a conductive material, and a binder.

In the present invention, the solid electrolyte material contained in the anode active material layer-forming material is preferably the sulfide solid electrolyte material obtained by the method described in "A. Method for producing sulfide solid electrolyte material" described above, because a lithium solid state battery having high safety and suitable for attainment of high output can be obtained. The content of the solid electrolyte material in the anode active material layer-forming material is within a range of 0.1% by volume to 80% by volume, for example, preferably within a range of 1% by volume to 60% by volume, and particularly preferably within a range of 10% by volume to 50% by volume.

Examples of the anode active material include a metal active material and a carbon active material. Examples of the metal active material include In, Al, Si, and Sn. Meanwhile, examples of the carbon active material include mesocarbon microbead (MCMB), highly-oriented graphite (HOPG), hard carbon, and soft carbon. The conductive material and the binder used in the anode active material layer are similar to those used in the cathode active material layer described above.

The thickness of the anode active material layer is preferably within a range of 0.1 μm to 1000 μm, for example. Examples of a method for forming the anode active material layer include a method for compression molding the anode active material layer-forming material.

4. Other Steps

The invention may comprise a cathode current collector formation step for forming a cathode current collector which collects the power of the cathode active material layer and an anode current collector formation step for forming an anode current collector which collects the power of the anode active material layer. Examples of a material of the cathode current collector include SUS, aluminum, nickel, iron, titanium, and carbon, and SUS is particularly preferable. Meanwhile, examples of a material of the anode current collector include SUS, copper, nickel, and carbon, and SUS is particularly preferable. It is preferable that the thickness and the shape of the cathode current collector and the anode current collector are suitably selected depending on, for example, the application of a lithium solid state battery.

The invention may comprise a sealing step for sealing a power generating element constituted of the cathode active material layer, the anode active material layer, and the solid electrolyte layer in a battery case. Examples of the battery case comprise a battery case made of SUS. In the present invention, the power generating element may be formed inside an insulating ring.

The lithium solid state battery obtained by the present invention may be a primary battery or a secondary battery and is particularly preferably a secondary battery. The reason therefor is because the secondary battery is chargeable and dischargeable and is useful as a car-mounted battery, for example. Examples of the shape of the lithium solid state battery of the present invention include a coin shape, a laminate shape, a cylindrical shape and a rectangular shape.

The present invention is not limited to the above embodiments. The above embodiments are exemplification, and any is included in the technical scope of the present invention if it has substantially the same constitution as the technical idea described in the scope of the claims of the present invention and offers similar operation and effect thereto.

EXAMPLES

Hereinafter, the present invention is described more specifically while showing examples.

Example 1

As a starting material, lithium sulfide ($Li_2S$) and phosphorus pentasulfide ($P_2S_5$) were used. Those powders were weighed in a glove box under an Ar atmosphere (dew point −70° C.) so that the molar ratio was $75Li_2S \cdot 25P_2S_5$ and mixed in an agate mortar, and 1 g of a raw material composition ($Li_2S$=0.3827 g and $P_2S_5$=0.6173 g) was obtained. Then, 1 g of the obtained raw material composition was introduced into a zirconia pot of 45 ml, ten zirconia balls (φ10 mm) were further introduced, and the pot was completely sealed (Ar atmosphere). The pot was attached to a planetary ball mill machine (P7™ manufactured by Fritsch Japan Co., Ltd.), mechanical milling was performed at a weighing table rotation number of 370 rpm for 40 hours, and an amorphized sulfide solid electrolyte material (sample 1) was obtained.

After that, the sample 1 was put in a carbon crucible equipped in a quartz tube under an Ar atmosphere, and the quartz tube was vacuum-sealed. The internal pressure of the quartz tube was approximately 3 torr to 10 torr. Then, the temperature of the quartz tube was increased to 700° C. at a rate of 100° C./h and held for 8 hours. Then, the temperature was slowly cooled to room temperature within about 6 hours, and a crystallized sulfide solid electrolyte material (sample 2) was obtained.

After that, 500 mg of the sample 2 was weighed in the glove box under an Ar atmosphere (dew point −70° C.) and introduced into a zirconia pot of 45 ml, ten zirconia balls (0.0 mm) were further introduced, and the pot was completely sealed (Ar atmosphere). The pot was attached to a planetary ball mill machine (P7™ manufactured by Fritsch Japan Co., Ltd.), mechanical milling was performed at a weighing table rotation number of 370 rpm for 40 hours, and an amorphized sulfide solid electrolyte material (sample 3) was obtained. According to this constitution, the sulfide solid electrolyte material in the present invention was obtained.

Comparative Example 1

The sample 1 in the example 1 was used as a comparative sample.

Comparative Example 2

The sample 2 in the example 1 was used as a comparative sample.

Synthetic Example 1

As in Example 1, the sample 1 was put in a carbon crucible equipped in a quartz tube under an Ar atmosphere, and the quartz tube was vacuum-sealed. The internal pressure of the quartz tube was approximately 3 torr to 10 torr. Then, the temperature of the quartz tube was increased to 290° C. at a rate of 100° C./h and held for 8 hours. Then, the temperature was slowly cooled to room temperature within about 3 hours, and a crystallized sulfide solid electrolyte material (sample 4) was obtained.

[Evaluation 1]

(X-Ray Diffraction Measurement)

Figure 4:
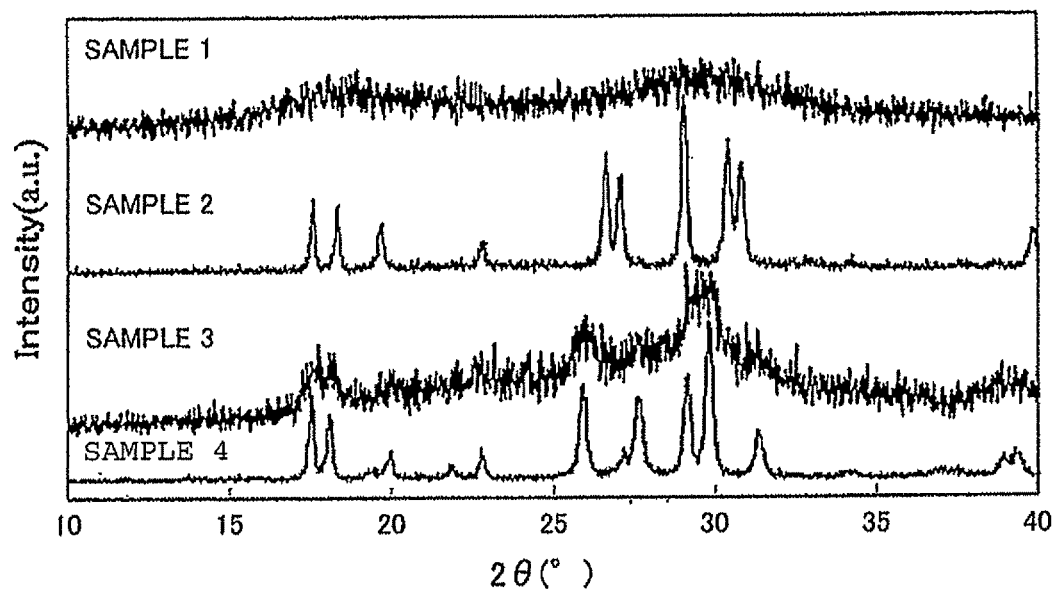
FIG. 4 is a view showing results of XRD measurement with respect to samples 1 to 4.

The samples 1 to 4 were subjected to X-ray diffraction (XRD) measurement. The results are shown in FIG. 4. As shown in FIG. 4, in the samples 1 and 3, an amorphized sulfide solid electrolyte material was obtained. Meanwhile, in the samples 2 and 4, a crystallized sulfide solid electrolyte material was obtained. Consequently, it was confirmed that an amorphized sulfide solid electrolyte material (sample 1) was obtained by mechanical milling, a crystallized sulfide solid electrolyte material (sample 2) was obtained by heat treatment, and an amorphized sulfide solid electrolyte material (sample 3) was obtained by mechanical milling performed again. When the intensity of the main peak (2θ=28°) of the sample 2 is represented by $I_M$ and the intensity of the main peak of the sample 3 is represented by $I_{M'}$, $I_{M'}/I_M$=20%.

(X-Ray Photoelectron Spectroscopy Measurement)

Figure 5:
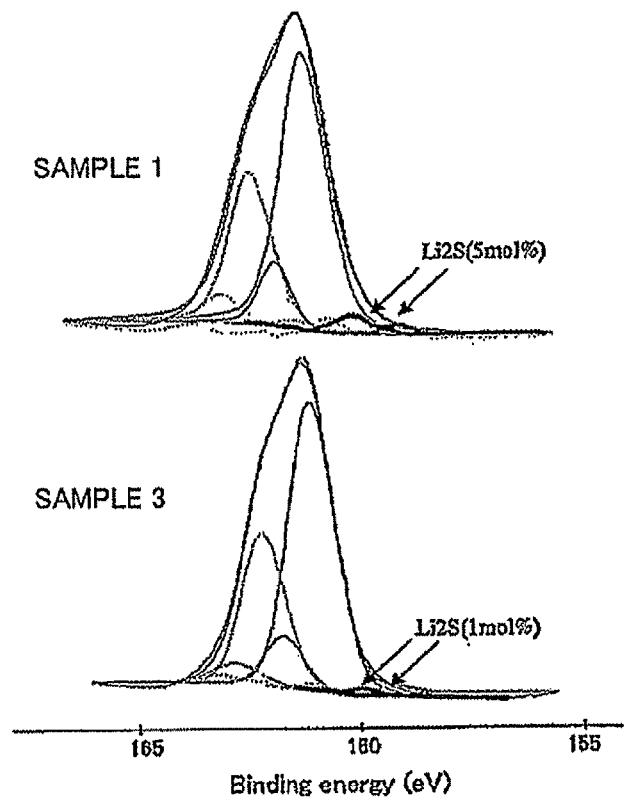
FIG. 5 is a view showing results of XPS measurement with respect to the samples 1 and 3.

The samples 1 and 3 were subjected to X-ray photoelectron spectroscopy (XPS) measurement. The results are shown in FIG. 5. As shown in FIG. 5, in the sample 1, it was confirmed that mol % of $Li_2S$ remained. Although the peak of $Li_2S$ was not detected in the sample 1 in the results of XRD described above, the existence of $Li_2S$ could be confirmed in the results of XPS. This is because it is considered that the $Li_2S$ residual amount in the sample 1 is small. Meanwhile, in the sample 3, it was confirmed that the $Li_2S$ residual amount (residual concentration) was reduced to 1 mol %.

(Hydrogen Sulfide Generation Amount Measurement)

Figure 6:
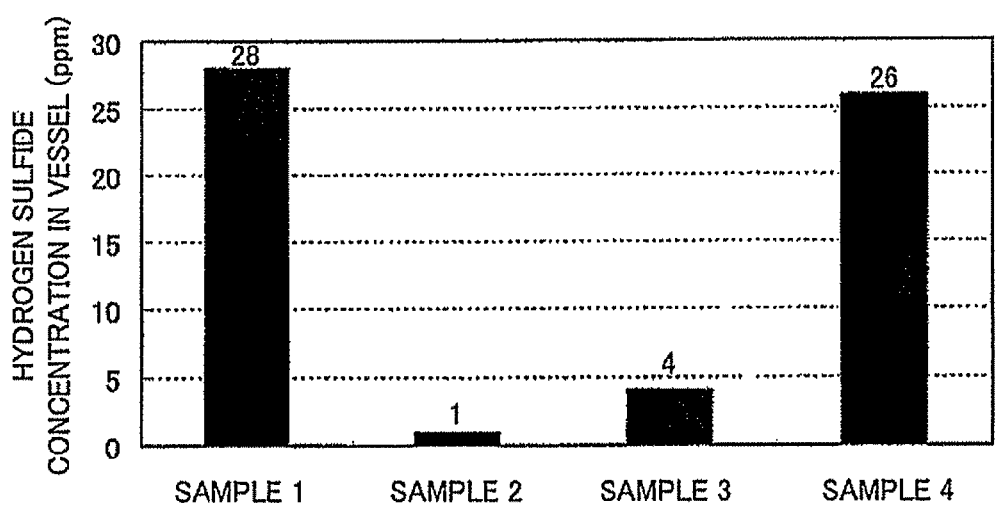
FIG. 6 is a view showing results of hydrogen sulfide generation amount measurement with respect to the samples 1 to 4.

The hydrogen sulfide generation amounts in the samples 1 to 4 were measured. The hydrogen sulfide generation amount measurement was performed as follows. 50 mg of a sample powder under an Ar atmosphere was weighed and left at rest in a closed vessel (having a capacity of 1750 cc in a humidified state in which the humidity was 80% and the temperature was 20° C.) The closed vessel was stirred by a fan, and a hydrogen sulfide sensor was used for the measurement. The hydrogen sulfide concentration in the closed vessel after a lapse of 5 minutes from air exposure of each sample is shown in FIG. 6. As shown in FIG. 6, the hydrogen sulfide generation amount in the sample 3 was significantly small in comparison with the sample 1. In the sample 4, the slight reduction of the hydrogen sulfide generation amount was confirmed.

(Li Ion Conductivity Measurement)

Figure 7:
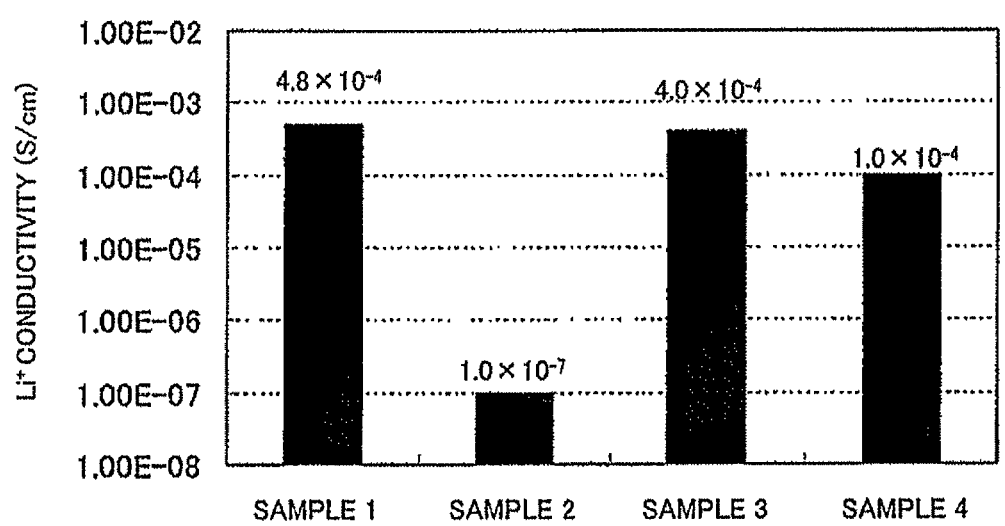
FIG. 7 is a view showing results of Li ion conductivity measurement with respect to the samples 1 to 4.

The Li ion conductivity of the samples 1 to 4 were measured. The Li ion conductivity was measured as follows. 100 mg of a sample added to a support tube (formed of Macor) was held by electrodes formed of SKD. Thereafter, the sample was compacted under a pressure of 4.3 ton/cm$^2$ to perform impedance measurement while restricting the sample at 6 N cm. Solartron 1260™ was used for the measurement, and the measurement conditions were an applied voltage of 5 my and a measurement frequency band of 0.01 MHz to 1 MHz. The results are shown in FIG. 7. As shown in FIG. 7, the Li ion conductivity of the sample 3 is significantly higher than that of the sample 2, and the Li ion conductivity is recovered to the same level as the sample 1.

Example 2

As a starting material, lithium sulfide ($Li_2S$) and phosphorus pentasulfide ($P_2S_5$) were used. Those powders were weighed in a glove box under an Ar atmosphere (dew point −70° C.) so that the molar ratio was $75Li_2S.25P_2S_5$ and mixed in an agate mortar, and 1 g of a raw material composition ($Li_2S$=0.3827 g and $P_2S_5$=0.6173 g) was obtained. Then, 1 g of the raw material composition was put in a carbon crucible equipped in a quartz tube, and the quartz tube was vacuum-sealed. The internal pressure of the quartz tube was approximately 10$^{-5}$ torr. Then, the temperature of the quartz tube was increased to 700° C. at a rate of 100° C./h and held for 8 hours. Then, the temperature was slowly cooled to room temperature within about 6 hours, and a crystallized sulfide solid electrolyte material was obtained.

Then, 500 mg of the crystallized sulfide solid electrolyte material was then weighed in the glove box under an Ar atmosphere (dew point −70° C.) and introduced into a zirconia pot of 45 ml, ten zirconia balls (φ10 mm) were introduced, and the pot was completely sealed (Ar atmosphere). The pot was attached to a planetary ball mill machine (P7™ manufactured by Fritsch Japan Co., Ltd.), mechanical milling was performed at a weighing table rotation number of 370 rpm for 40 hours, and an amorphized sulfide solid electrolyte material was obtained. When the Li ion conductivity was measured, it was confirmed that the Li ion conductivity was more improved than that of the crystallized sulfide solid electrolyte material.

REFERENCE SIGNS LIST

1 . . . Cathode active material layer
2 . . . Anode active material layer
3 . . . Solid electrolyte layer

The invention claimed is:

1. A method for producing a sulfide solid electrolyte material comprising:
   a step of heating a raw material composition containing $Li_2S$ and $P_2S_5$ to obtain a crystallized sulfide solid electrolyte material; and
   a step of applying amorphization treatment to the crystallized sulfide solid electrolyte material.

2. The method for producing a sulfide solid electrolyte material according to claim 1, wherein the heating step comprises:
   applying amorphization treatment to the raw material composition to obtain an amorphized sulfide solid electrolyte material, and
   applying crystallization treatment by heat treatment to the amorphized sulfide solid electrolyte material to obtain the crystallized sulfide solid electrolyte material.

3. The method for producing a sulfide solid electrolyte material according to claim 2, wherein a temperature of the heat treatment is not less than 300° C.

4. The method for producing a sulfide solid electrolyte material according to claim 1, wherein the heating step is a solid-phase reaction step of heating the raw material composition in a solid phase reaction to obtain the crystallized sulfide solid electrolyte material.

5. The method for producing a sulfide solid electrolyte material according to claim 1, wherein a ratio of $Li_2S$ and $P_2S_5$ in the raw material composition is within a range of $Li_2S:P_2S_5$=70:30 to 80:20 on a molar basis.

6. The method for producing a sulfide solid electrolyte material according to claim 1, wherein a residual amount of $Li_2S$ in the crystallized sulfide solid electrolyte material is not more than 1 mol %.

7. The method for producing a sulfide solid electrolyte material according to claim 1, wherein the amorphization treatment is mechanical milling.

8. A method for producing a lithium solid state battery, which comprises a cathode active material layer containing a cathode active material, an anode active material layer containing an anode active material, and a solid electrolyte layer formed between the cathode active material layer and the anode active material layer, the method comprising adding the sulfide solid electrolyte material obtained by the method for producing a sulfide solid electrolyte material according to claim 1 to at least one of the cathode active material layer, the anode active material layer, and the solid electrolyte layer.

* * * * *